(12) United States Patent
Xiu et al.

(10) Patent No.: US 11,127,019 B2
(45) Date of Patent: Sep. 21, 2021

(54) SECURITY VERIFICATION METHOD AND DEVICE FOR SMART CARD APPLICATION

(71) Applicant: Advanced New Technologies Co., Ltd., George Town (KY)

(72) Inventors: Chao Xiu, Hangzhou (CN); Lei Wang, Hangzhou (CN); Chenjie Shi, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 301 days.

(21) Appl. No.: 16/027,083

(22) Filed: Jul. 3, 2018

(65) Prior Publication Data

US 2018/0315048 A1 Nov. 1, 2018

Related U.S. Application Data

(63) Continuation of application No. PCT/CN2016/112265, filed on Dec. 27, 2016.

(30) Foreign Application Priority Data

Jan. 5, 2016 (CN) .......................... 201610006062.2

(51) Int. Cl.
*G06Q 20/00* (2012.01)
*G06Q 20/40* (2012.01)
(Continued)

(52) U.S. Cl.
CPC ........... *G06Q 20/409* (2013.01); *G06F 21/34* (2013.01); *G06F 21/44* (2013.01);
(Continued)

(58) Field of Classification Search
CPC ........... G06Q 2220/00; G06Q 2220/10; G06Q 2220/16; G06Q 20/409; G06Q 20/3278;
(Continued)

(56) References Cited

U.S. PATENT DOCUMENTS 9,122,868 B2 * 9/2015 Blanchet .............. G06Q 20/382
9,390,242 B2 * 7/2016 Grigg ...................... G06F 21/31
(Continued)

FOREIGN PATENT DOCUMENTS

CN 102855560 1/2013
CN 103065240 4/2013
(Continued)

OTHER PUBLICATIONS

EP Reference attached Apr. 21, 2010.*
(Continued)

*Primary Examiner* — Dante Ravetti
(74) *Attorney, Agent, or Firm* — Fish & Richardson P.C.

(57) ABSTRACT

The present application relates to the field of information security technologies, and in particular, to smart card security verification methods and devices. In one example method, in response to detecting processing associated with a particular service at a smart card application of an intelligent terminal, a set of data related to the particular service is obtained. A set of security parameters associated with the smart card application are identified. The obtained set of data related to the particular service is compared to the identified set of security parameters. In response to determining from the comparison that the obtained set of data related to the particular service satisfies the identified set of security parameters, the particular service to is allowed to execute. In response to determining that the obtained set of data related to the particular service does not satisfy the identified set of security parameters, the particular service is terminated.

15 Claims, 7 Drawing Sheets

(51) Int. Cl.
  *G06F 21/34* (2013.01)
  *G06Q 20/32* (2012.01)
  *G06Q 20/34* (2012.01)
  *H04W 12/126* (2021.01)
  *H04W 4/80* (2018.01)
  *G06F 21/44* (2013.01)
  *H04W 12/61* (2021.01)
  *H04W 12/63* (2021.01)

(52) U.S. Cl.
  CPC ....... *G06Q 20/3278* (2013.01); *G06Q 20/341* (2013.01); *G06Q 20/352* (2013.01); *G06Q 20/4016* (2013.01); *H04W 4/80* (2018.02); *H04W 12/126* (2021.01); *H04W 12/61* (2021.01); *H04W 12/63* (2021.01)

(58) Field of Classification Search
  CPC ............. G06Q 20/4016; G06Q 20/341; G06Q 20/352; H04W 12/126; H04W 4/80; H04W 12/61; H04W 12/63; G06F 21/34; G06F 21/44
  See application file for complete search history.

(56) References Cited

U.S. PATENT DOCUMENTS

| | | | | |
|---|---|---|---|---|
| 9,454,758 | B2* | 9/2016 | Desai | G06Q 20/08 |
| 9,811,830 | B2* | 11/2017 | Cowan | G06Q 20/4016 |
| 2010/0145819 | A1 | 6/2010 | Park | |
| 2012/0166332 | A1* | 6/2012 | Naaman | G06Q 20/3278 |
| | | | | 705/40 |
| 2012/0197793 | A1* | 8/2012 | Grigg | G06Q 20/42 |
| | | | | 705/41 |
| 2012/0295588 | A1 | 11/2012 | Chen et al. | |
| 2015/0142595 | A1 | 5/2015 | Acuña-Rohter | |
| 2016/0140561 | A1* | 5/2016 | Cowan | G06Q 20/20 |
| | | | | 705/26.35 |

FOREIGN PATENT DOCUMENTS

| | | | |
|---|---|---|---|
| CN | 104132870 | 12/2014 | |
| CN | 104504568 | 4/2015 | |
| CN | 104751329 | 7/2015 | |
| CN | 104794615 | 7/2015 | |
| EP | 2500875 A1 * | 9/2012 | ......... G06Q 20/3229 |
| JP | 2003078952 | 3/2003 | |
| JP | 2012088952 | 5/2012 | |
| WO | WO 2014174506 | 10/2014 | |

OTHER PUBLICATIONS

EP Reference attached Date is Apr. 21, 2010.*
International Preliminary Report on Patentability in International Application No. PCT/CN2016/112265 dated Mar. 31, 2017; 8 pages.
International Search Report issued by the International Searching Authority in International Application No. PCT/CN2016/112265 dated Mar. 31, 2017; 9 pages.
Extended European Search Report in European Application No. 16883440.6, dated Oct. 4, 2018, 7 pages.
Schmitz, Security-insider.de [online], "TPM-Modul als virtual Smartcard," Aug. 2014, retrieved on Aug. 9, 2019, retrieved from URL<https://www.security-insider.de/tpm-modul-als-virtuelle-smartcard-a-454805/>, 7 pages (with Machine Translation).
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

US 11,127,019 B2

SECURITY VERIFICATION METHOD AND DEVICE FOR SMART CARD APPLICATION

APPLICATION

This application is a continuation of PCT Application No. PCT/CN2016/112265, filed on Dec. 27, 2016, which claims priority to Chinese Patent Application No. 201610006062.2, filed on Jan. 5, 2016, and each application is hereby incorporated by reference in its entirety.

TECHNICAL FIELD

The present application relates to the field of information security technologies, and in particular, to smart card security verification methods and devices.

BACKGROUND

With the development of mobile Internet technologies, an increasing number of services can be implemented by using smart card applications on an intelligent terminal. For example, a near field communication chip can help the intelligent terminal implement smart card applications such as by making a mobile payment, taking a public vehicle, or entering a working area. As the intelligent terminal plays an increasingly important role in people's life, when the intelligent terminal is lost and maliciously used, significant damages can be caused to the user, the company or the public. Currently, a technical solution is needed to enhance security of smart card applications for smart terminals.

SUMMARY

To resolve a problem in the existing technology that security of a smart card application cannot be ensured after theft of an smart terminal, a security verification method and device for a smart card application are proposed, so as to restrict use of the smart card application based on user setting or a user's habit, thereby ensuring the security of the smart card application.

An implementation of the present application provides a security verification method for a smart card application, including: obtaining related data of a current service when the smart card application performs service processing with the outside; determining the related data of the current service and a security parameter; and terminating the current service if the related data of the current service does not comply to the security parameter.

An implementation of the present application further provides a security verification device for a smart card application, including: an acquisition unit, configured to obtain related data of a current service when the smart card application performs service processing with the outside; a determining unit, configured to determine the related data of the current service and a security parameter; and a processing unit, configured to terminate the current service if the related data of the current service does not comply to the security parameter.

It can be seen from the described technical solutions of implementations of the present application that, a geographic location, time, transaction information, etc. of a service are determined, so as to ensure security of performing the service by using the smart card application. In addition, based on different types of smart card applications (an eSE chip, an HCE, etc.), a security verification method applicable to the different types of smart card applications is designed. For example, a service process between a smart card application in the eSE chip and a communication module is obtained for verification, or service security verification is performed by using a security verification method in a smart card application built in the HCE.

Certainly, implementing any product or method in the present application does not need to simultaneously satisfy all advantages described above.

BRIEF DESCRIPTION OF DRAWINGS

To describe the technical solutions in the implementations of the present application or in the existing technology more clearly, the following briefly introduces the accompanying drawings for describing the implementations or the existing technology. Apparently, the accompanying drawings in the following description merely show some implementations of the present application, and a person of ordinary skill in the art can still derive other drawings from these accompanying drawings without creative efforts.

DESCRIPTION OF IMPLEMENTATIONS

Implementations of the present application provide a security verification method and device for a smart card application.

To make a person skilled in the art better understand the technical solutions in the present application, the following clearly and completely describes the technical solutions in the implementations of the present application with reference to the accompanying drawings in the implementations of the present application. Apparently, the described implementations are merely some but not all of the implementations of the present application. Other implementations obtained by a person of ordinary skill in the art based on the implementations of the present application without creative efforts shall fall within the protection scope of the present application.

The smart card application in the present application includes, for example, an access control application, a transportation card application, and a bank card application. The smart card application can be installed on an embedded security element (eSE) chip disposed in an intelligent terminal, or the smart card application can be implemented by using a host card emulation (HCE) technology. Details of these two applications are not described in the present application.

Figure 1:
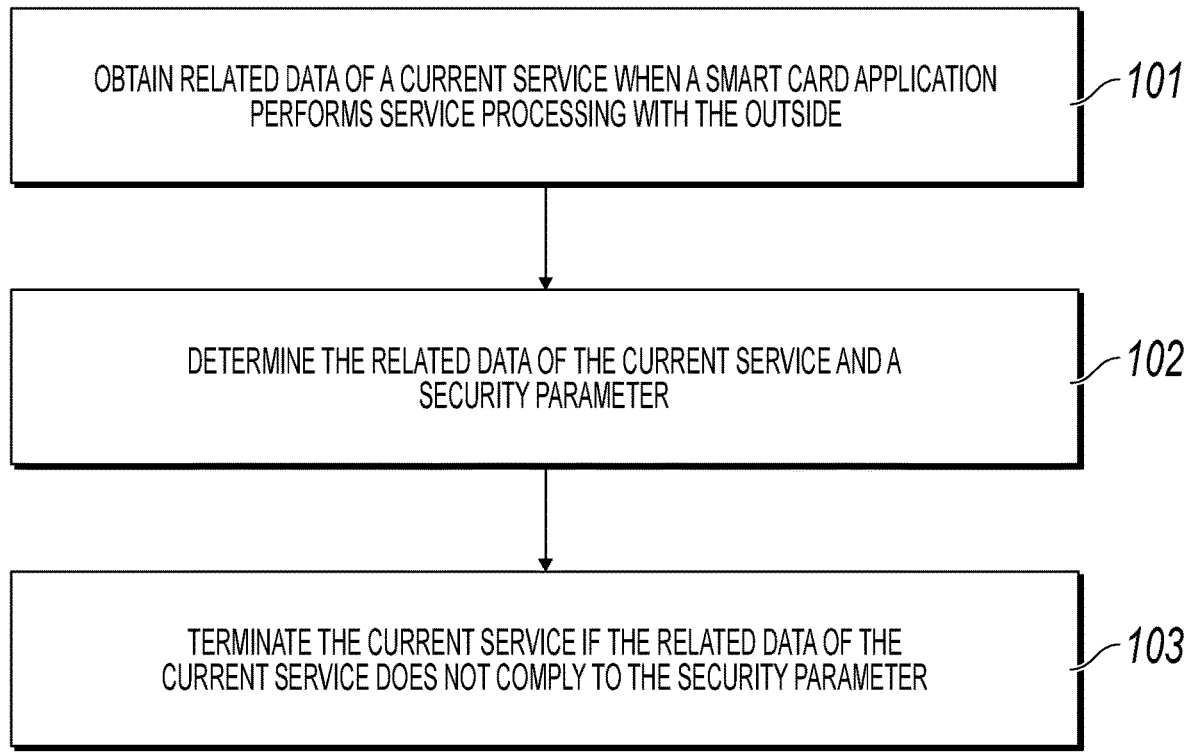
FIG. 1 is a flowchart illustrating a security verification method for a smart card application, according to an implementation of the present application.

As shown in FIG. 1, FIG. 1 is a flowchart illustrating a security verification method for a smart card application, according to an implementation of the present application. In this implementation, when an intelligent terminal performs service processing with a transaction terminal, the intelligent terminal determines, based on a determination rule, whether the current service is secure. If not, the service is interrupted. Otherwise, the service is allowed to continue. The determination rule can be based on location information, time information, service content, etc., and can be voluntarily set by a user, or provided to the intelligent terminal after statistically analyzed by a system. The smart card application can be securely controlled, so as to avoid damage caused by losing the device.

The method includes step 101, obtain related data of a current service when the smart card application performs external service processing.

Step 102: Determine the related data of the current service and a security parameter.

Step 103: Terminate the current service if the related data of the current service does not comply to the security parameter.

According to an implementation of the present application, the method further includes: allowing the current service to continue if the related data of the current service complies to the security parameter. By determining the related data of the current service, the current service can be terminated or authorized, so as to ensure security of the current service performed by the smart card application.

According to an implementation of the present application, the related data of the current service includes at least one or a combination of current location information, current time information, or transaction information. The current location information and location information that is set in the security parameter can be determined. If a current location is beyond a location range that is set in the security parameter, the service is not allowed to continue. For example, when the smart card application currently performs a service in area A, and a location range that is set by the user in the security parameter is area B, the current service performed by the smart card application is considered as insecure. When a payment transaction of a service currently performed by the smart card application is 1000 RMB, and transaction information that is set by the user in the security parameter is 800 RMB, the current service performed by the smart card application is considered as insecure.

For the related data of the current service, the current location information can be obtained by using a GPS module of the intelligent terminal or through base station positioning, the current time information can be obtained by using a system clock or a network clock, and the transaction information can be obtained by using a transaction order. For specific positioning methods, reference can be made to the existing positioning technology. The current time information can be obtained with reference to a specific solution in the existing technology. Details are not described here for simplicity.

According to an implementation of the present application, obtaining related data of a current service when the smart card application performs service processing with the outside further includes: monitoring communications between the two parties, and obtaining the related data of the current service when a smart card application built in an eSE chip communicates with an near field communication (NFC) controller.

In this implementation of the present step, the method in this implementation of the present application can be implemented in a software method or a hardware module method. The method includes obtaining the related data of the current service and subsequent processes such as determining and analyzing. The method is activated by monitoring the communications between the smart card application in the eSE chip and the NFC controller (or a similar communication module used by another smart card application). Or the NFC controller can notify a security verification application in the present application when performing a service. In other words, whether service processing is performed between the smart card application in the eSE chip and the NFC controller is monitored based on the security verification method in this implementation of the present application. Security verification is started when service processing occurs.

In this implementation, the related data of the current service can be obtained and subsequent steps can be performed at any time during the communications between the smart card application and the NFC controller. For example, security verification is performed before the NFC controller forwards a service instruction to the smart card application.

According to an implementation of the present application, obtaining related data of a current service when the smart card application performs service processing with the outside further includes: monitoring communications between the two parties in the virtual smart card application when a virtual HCE smart card application communicates with an NFC controller, and obtaining the related data of the current service.

In this implementation of the present step, when the smart card application is implemented by using an HCE smart card application, the security verification method in the present application can be applied to the application, and the security verification method in this implementation of the present application can be performed before or after the steps included in the process of performing a service by the HCE. When security verification succeeds, the service process can be continued. Otherwise, the service process is terminated.

According to an implementation of the present application, before determining the related data of the current service and the security parameter, the method further includes: receiving and storing a security parameter entered by a user; or receiving and storing a security parameter obtained by a server through analysis based on related data of a user.

In this implementation of the present step, the security parameter can be voluntarily set by the user, or can be determined by the server based on analysis of historical behavior of the user. For example, when statistical analysis shows that the user has never appeared in area A, but location information of the current service is area A, the service can be considered as risky, and the current service of the user can be rejected. Further, in this implementation, for example, when the service is authentication for access control and the user has never asked to enter area A, a current requirement of entering area A can occur when a mobile phone including an access-control smart card application is lost and misused by another person.

Based on the method in this implementation of the present application, a geographic location, time, transaction information, etc. of a service are determined, so as to ensure security of performing the service by using a smart card application. In addition, based on different types of smart card applications (an eSE chip, an HCE, etc.), a security verification method applicable to the different types of smart card applications is designed. For example, a service process between a smart card application in the eSE chip and a communication module is obtained for verification, or service security verification is performed by using a security verification method in a smart card application built in the HCE.

Figure 2:
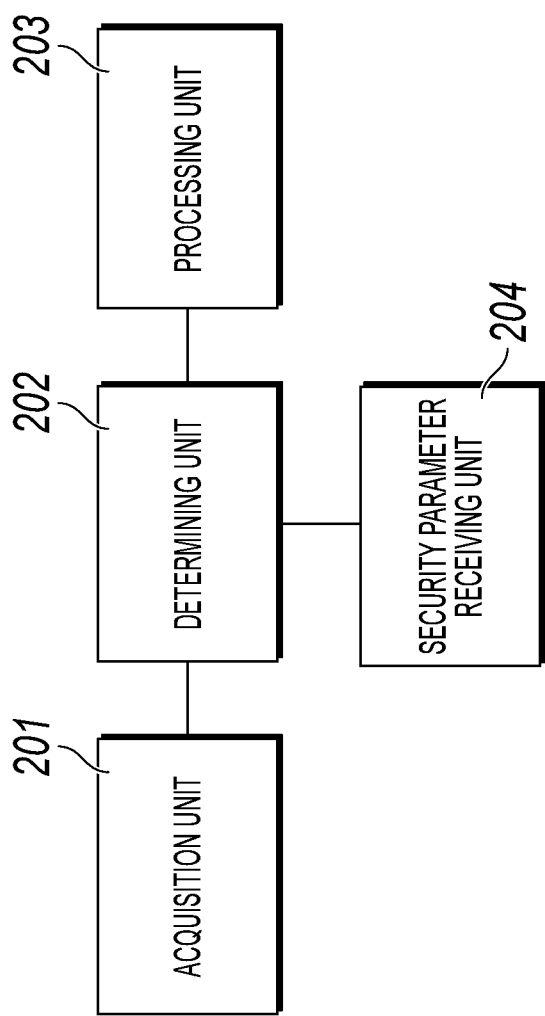
FIG. 2 is a schematic structural diagram illustrating a security verification device for a smart card application, according to an implementation of the present application.

As shown in FIG. 2, FIG. 2 is a schematic structural diagram illustrating a security verification device for a smart card application, according to an implementation of the present application. The device in this implementation can be built in and run on an intelligent terminal. The intelligent terminal includes, for example, a smartphone or a tablet computer. The verification device for the smart card application can be implemented by using a dedicated chip such as a programmable logic device (FPGA), or by using software in an HCE smart card application.

The diagram includes: an acquisition unit 201, configured to obtain related data of a current service when the smart card application performs service processing with the outside; a determining unit 202, configured to determine the related data of the current service and a security parameter; and a processing unit 203, configured to terminate the current service if the related data of the current service does not comply to the security parameter.

According to an implementation of the present application, the processing unit is further configured to allow the current service to continue if the related data of the current service complies to the security parameter.

According to an implementation of the present application, the related data of the current service includes at least one or a combination of current location information, current time information, or transaction information.

The current location information can be obtained by using a GPS module inside the intelligent terminal. The current time information can be obtained by using a network communication module, or can be obtained by using a clock oscillator inside the intelligent terminal. The transaction information can be obtained by using a transaction order of the intelligent terminal.

According to an implementation of the present application, the acquisition unit monitors communications between a smart card application built in an eSE chip and an NFC controller, and obtains the related data of the current service.

According to an implementation of the present application, the acquisition unit is built in a virtual smart card application, and obtains the related data of the current service in communications between the virtual HCE smart card application and an NFC controller.

According to an implementation of the present application, the device further includes a security parameter receiving unit 204, configured to receive and store a security parameter entered by a user; or receive and store a security parameter obtained by a server through analysis based on related data of a user.

Based on the device in this implementation of the present application, a geographic location, time, transaction information, etc. of a service are determined, so as to ensure security of performing the service by using a smart card application. In addition, based on different types of smart card applications (an eSE chip, an HCE, etc.), a security verification method applicable to the different types of smart card applications is designed. For example, a service process between a smart card application in the eSE chip and a communication module is obtained for verification, or service security verification is performed by using a security verification method in a smart card application built in the HCE.

Figure 3:
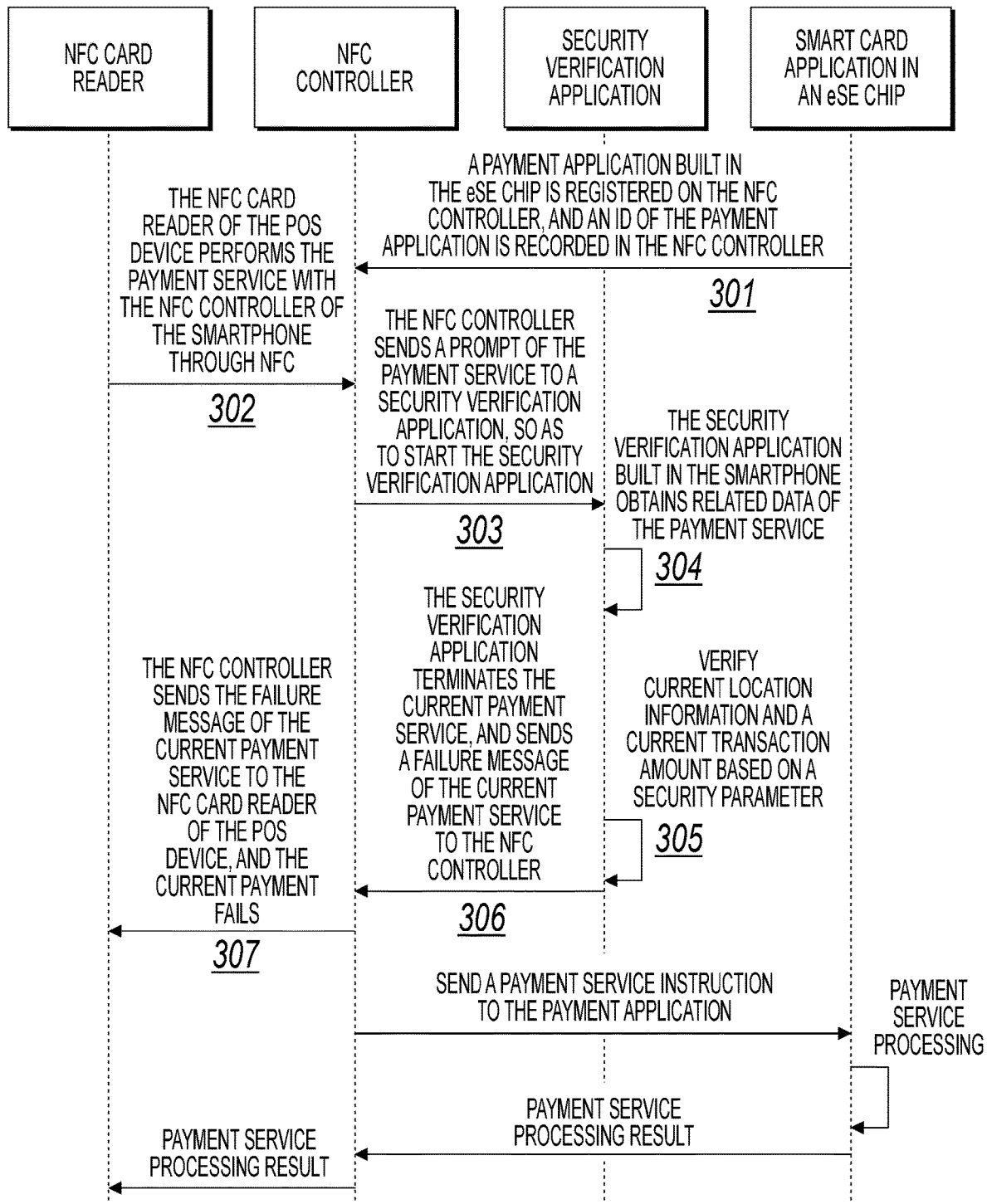
FIG. 3 is a flowchart illustrating a security verification method for a smart card application, according to an implementation of the present application.

As shown in FIG. 3, FIG. 3 is a flowchart illustrating a security verification method for a smart card application, according to an implementation of the present application. The smart card application in the diagram is built in an eSE chip. In this implementation, an intelligent terminal can be a smartphone, a card reader can be an NFC card reader installed on a point of sale (POS) device, and an NFC controller can be a piece of hardware on the smartphone, configured to communicate with the NFC card reader on the POS device, to complete a payment service. By using an apparatus, built in the smartphone, in this implementation of the present application or by using software based the method, payment service processing between the smart card application and the NFC controller is monitored, so as to implement payment service security verification.

Step 301: A payment application built in the eSE chip is registered on the NFC controller, and an ID of the payment application is recorded in the NFC controller.

Figure 4:
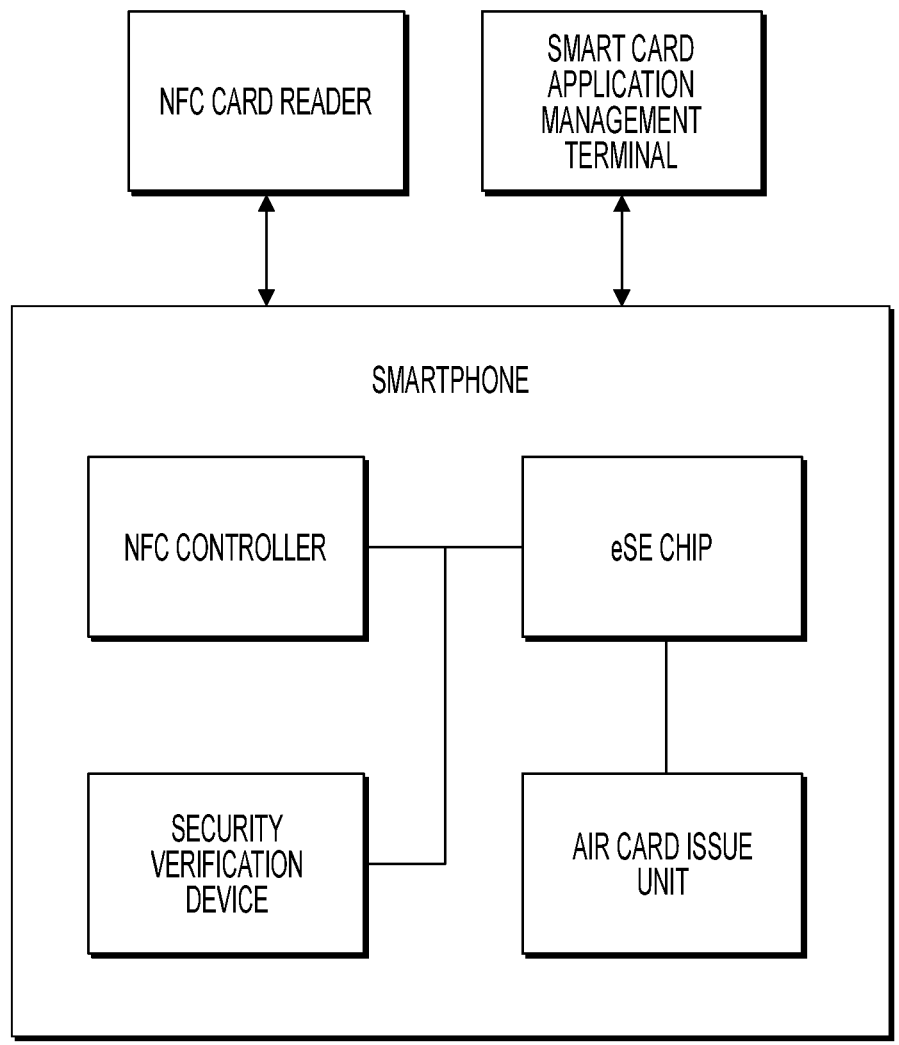
FIG. 4 is a diagram illustrating a system structure of installing a smart card application on an eSE chip, according to an implementation of the present application.

In this implementation, the smart card application can be installed on the eSE chip by using a smart card application management terminal, or by using an air card issue unit (which can be built inside the eSE chip of the smartphone) through a network. A specific system structure diagram can be shown in FIG. 4. The NFC card reader on the POS device communicates with the NFC controller of the smartphone through NFC. The smart card application management terminal installs the smart card application in the eSE chip of the smartphone through NFC, or the smart card application can be obtained from a far end by using the air card issue unit and installed in the eSE chip. A security verification application in the present application is also built in the smartphone to monitor communications between the eSE chip and the NFC controller. The security verification application can monitor the communications between the eSE chip and the NFC controller by using a communications interface in the NFC controller.

In or before the present step, a user can input through an input device of the smartphone, such as a touchscreen or a button, a security parameter in the security verification application built in the smartphone according to the present application. The security parameter in a smart card payment application can be, for example, a location limitation, a range limitation, or a transaction amount threshold. The number of security parameters can be set based on an actual need. In this implementation, location limitations can be, for example, area A, area B, and area C, and the smart card payment application is allowed to be used within the three areas, and the payment application is not allowed in other areas. The transaction amount threshold can be, for example, 1000 RMB, that is, spending is not allowed to exceed 1000 RMB regardless of the location. Certainly, a person skilled in the art can consider other combinations of security parameters based on the present disclosure, for example, a combination of transaction amount and a location limitation. For example, transaction amount in a limited location area can be unlimited, and the transaction amount in an area outside the location limitation can be capped at 100. If a time parameter is considered as a security parameter, more possible combinations of security parameters can be generated. This implementation of the present application cannot exhaust various possible combinations. Therefore, details are not described for simplicity.

Step 302: The NFC card reader of the POS device performs the payment service with the NFC controller of the smartphone through NFC.

In the present step, for the payment service processing between the NFC card reader and the NFC controller, reference can be made to solutions in the existing technology. For example, the NFC card reader selects the ID of the payment application registered with the NFC controller, and then performs a corresponding smart card payment service procedure.

Step 303: The NFC controller sends a prompt of the payment service to a security verification application, so as to start the security verification application.

Step 304: The security verification application built in the smartphone obtains related data of the payment service.

In the present step, the security verification application can obtain the related data of the payment service by using an interface of the NFC controller. In such case, the payment application does not obtain the related data of the payment service.

The related data of the payment service includes current location information and current transaction amount. The security verification application can obtain the current location information through GPS module in the smartphone, or can obtain the current location information through base station positioning or network positioning, and can obtain the current transaction amount by using an intercepted service processing result.

Step 305: Verify current location information and current transaction amount based on a security parameter.

In this implementation, intercepted location information is area D, and transaction amount is 2,000 RMB. The related data of the payment service is compared with the location limitation and the transaction amount threshold in the security parameter, and a determining result is that the related data of the payment service does not comply to the security parameter.

Step 306: The security verification application terminates the current payment service, and sends a failure message of the current payment service to the NFC controller.

In the present step, a security verification result can be prompted to the user on the smartphone screen.

If the determination result in step 305 is that the related data of the payment service complies to the security parameter, the current payment service is allowed to continue (not interfered), and the payment service between the NFC controller and the smart card application in the eSE chip is not interfered. The diagram illustrates a process of performing service processing by the payment application using a dashed line when the payment service is allowed to continue. The NFC controller forwards a payment service instruction to the payment application built in the eSE chip. The payment application performs service processing, and returns a service processing result to the NFC card reader by using the NFC controller. The payment application can communicate with the NFC card reader for many times, so as to successfully perform a payment service procedure. Details of this part can be referred to in the existing technology and is omitted for simplicity.

Step 307: The NFC controller sends the failure message of the current payment service to the NFC card reader of the POS device, and the current payment fails.

In this implementation, the smart card application can be managed in the technical solutions of the present application based on a security parameter set by the user. When an unauthorized (not complying to the security parameter) service is performed, insecure service processing of the smart card application is terminated in a timely manner, so as to ensure security of user property and information, thereby avoiding loss caused by malicious use if the intelligent terminal is lost.

Figure 5:
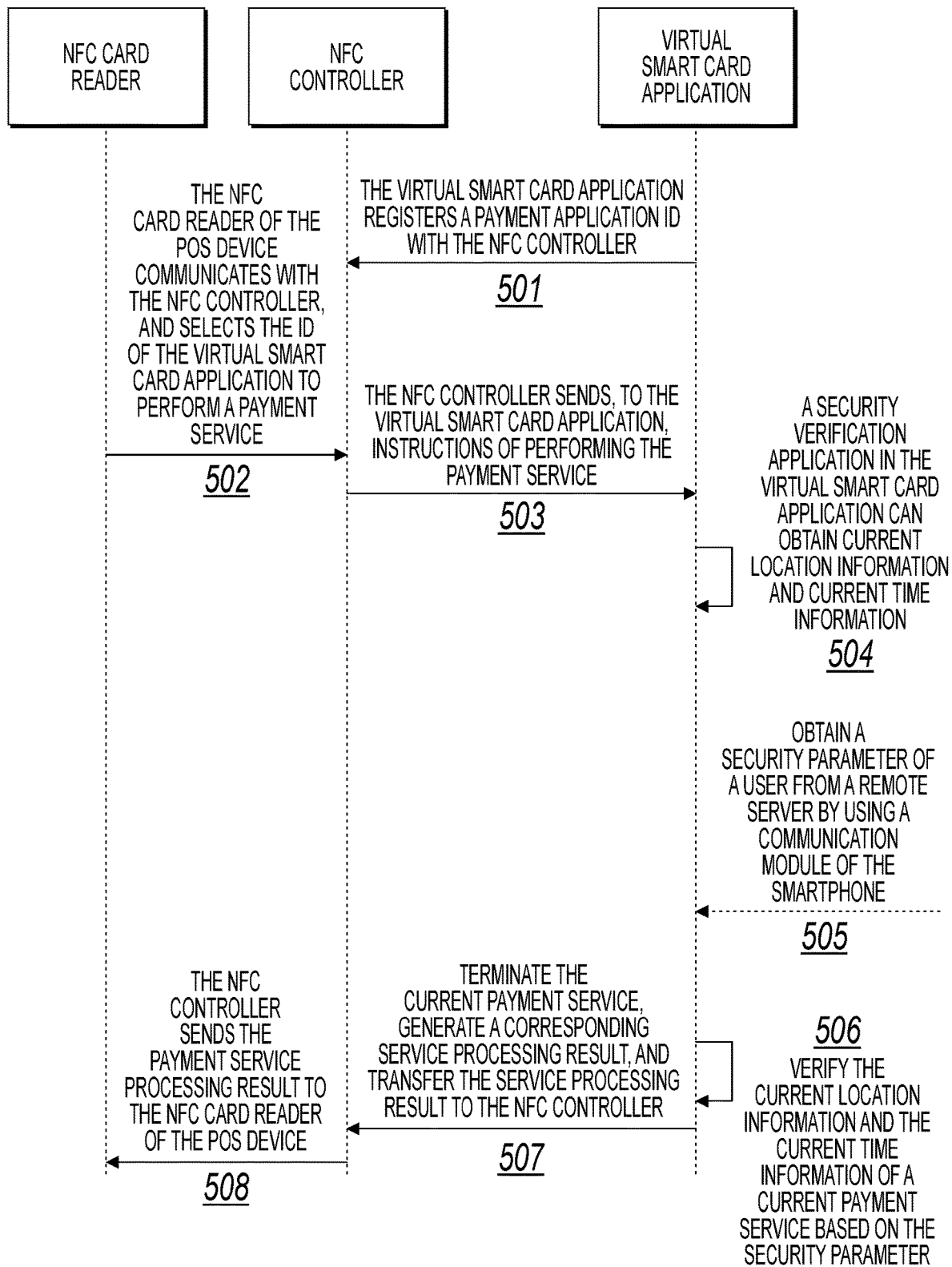
FIG. 5 is a flowchart illustrating another security verification method for a smart card application, according to an implementation of the present application.

As shown in FIG. 5, FIG. 5 is a flowchart illustrating another security verification method for a smart card application, according to an implementation of the present application. In this implementation, a virtual smart card application is used as an example to describe a technical solution of the present application. A virtual smart card can be used mainly for an intelligent terminal that has no built-in eSE chip, and can help the intelligent terminal support the smart card application. The security verification method or device in the present application can be built in the virtual smart card application, so as to implement security verification for the virtual smart card application. In this implementation, a payment service is still used as an example for description. The intelligent terminal is a smartphone, and a POS device card reader is an NFC card reader. The smartphone communicates with the NFC card reader by using an NFC controller. Certainly, in other implementations, an NFC technology in another mode can be used for communication. No limitation is imposed here.

Step 501: The virtual smart card application registers a payment application ID with the NFC controller.

Figure 6:
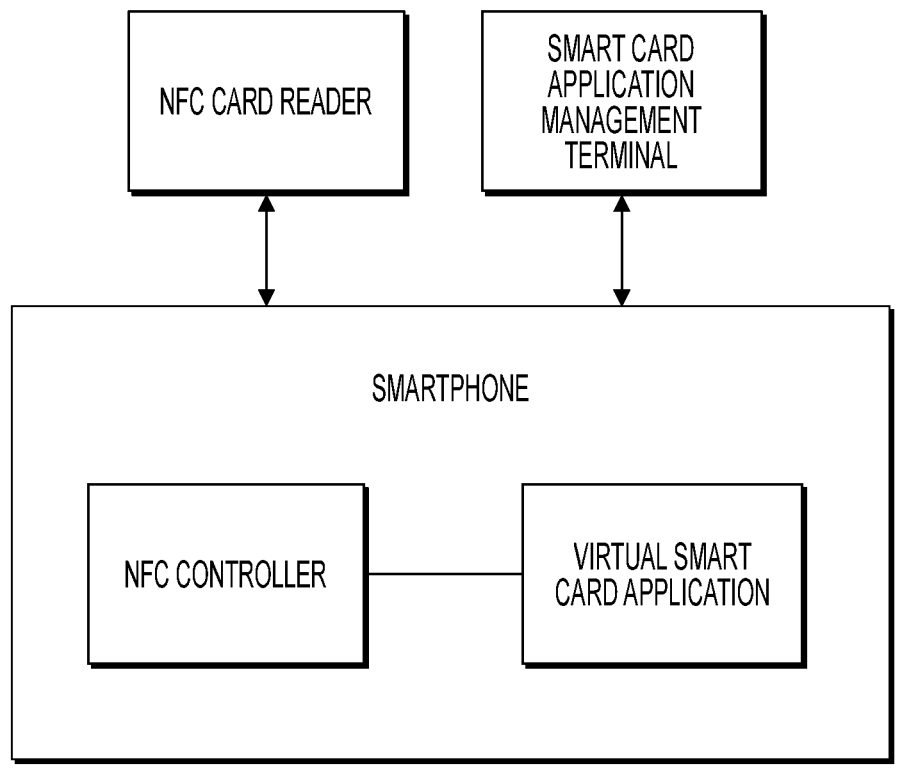
FIG. 6 is a diagram illustrating a system structure of installing a smart card application on a smartphone, according to an implementation of the present application.

In this implementation, the virtual smart card application can be loaded into a memory of the smartphone by using a smart card application management terminal. A specific system structure diagram can be shown in FIG. 6. The NFC card reader on the POS device communicates with the NFC controller of the smartphone through NFC. The smart card application management terminal installs the virtual smart card application in the memory of the smartphone through NFC, or the virtual smart card application can be obtained from a remote end by using an Internet function of the smartphone, and installed on the smartphone. A security verification application in the present application can be built in the virtual smart card application.

Step 502: The NFC card reader of the POS device communicates with the NFC controller, and selects the ID of the virtual smart card application to perform a payment service.

Step 503: The NFC controller sends, to the virtual smart card application, instructions of performing the payment service.

Step 504: A security verification application in the virtual smart card application can obtain current location information and current time information.

The current location information can be obtained by using a GPS module in the smartphone, or can be obtained through base station positioning or network positioning. The current time information can be obtained by using a system time of the smartphone, or can be obtained from the Internet by using the Internet function of the smartphone.

Step 505: Obtain a security parameter of a user from a remote server by using a communication module of the smartphone.

The security parameter in the present step can be obtained from the remote server through the Internet. The remote server obtains a corresponding security parameter by analyzing historical data of the user or by analyzing big data related to the user. For example, the security parameter of the user can be obtained by analyzing data such as payment transaction habit and daily payment transaction amount, location, time, and commodity category of the user, and a security risk of the current transaction can be determined based on the user data by using methods in the electronic transaction field. Specific security parameter calculation methods can be referred to in the existing technology, which is adopted here by reference.

A method for obtaining a security parameter in this implementation and the method for setting a security parameter by a user in the implementation shown in FIG. 3 can be interchanged.

Step 506: Verify the current location information and the current time information of a current payment service based on the security parameter.

If location information in the security parameter is different from the current location information, and time information in the security parameter is different from the current time information, it indicates that the user usually does not perform a payment service at a current time or a current location, the payment service may not be implemented by the user and can be risky.

Step 507: Terminate the current payment service, generate a corresponding service processing result, and transfer the service processing result to the NFC controller.

If a determining result in step 506 is a secure payment service, a payment service procedure of the virtual smart card application continues, and the NFC controller can communicate with the NFC card reader of the POS device for one or more times during this period of time to complete the payment service procedure.

Step 508: The NFC controller sends the payment service processing result to the NFC card reader of the POS device.

Based on the method and device in the implementations of the present application, a geographic location, time, transaction information, etc. of a service can be determined, so as to ensure security of performing the service by using a smart card application. In addition, based on different types of smart card applications (an eSE chip, an HCE, etc.), a security verification method applicable to the different types of smart card applications is designed. For example, a service process between a smart card application in the eSE chip and a communication module is obtained for verification, or service security verification is performed by using a security verification method in a smart card application built in the HCE.

Whether a technology improvement is a hardware improvement (for example, an improvement of a circuit structure, such as a diode, a transistor, or a switch) or a software improvement (an improvement of a method procedure) can be obviously distinguished. However, as technologies develop, many current improvements of a method procedure can be considered as a direct improvement of a hardware circuit structure. A designer usually programs an improved method procedure to a hardware circuit to obtain a corresponding hardware circuit structure. Therefore, a hardware entity module can improve a method procedure. For example, a programmable logic device (PLD) (for example, an FPGA is such an integrated circuit, and a logical function of the programmable logic device is determined by a user through device programming. The designer performs programming to "integrate" a digital system to a PLD without requesting a chip manufacturer to design and produce an application-specific integrated circuit chip 2. In addition, the programming is mostly implemented by modifying "logic compiler" software instead of manually making an integrated circuit chip. This is similar to a software compiler used to develop and compose a program. Original code before being compiled also needs to be written in a specific programming language, and this is referred to as hardware description language (HDL). However, there are various HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). Currently, VHDL (Very-High-Speed Integrated Circuit Hardware Description Language) and Verilog 2 are most popular. A person skilled in the art should also understand that, only logic programming needs to be performed on the method procedure by using the described several hardware description languages, and the method procedure is programmed to an integrated circuit, so that a hardware circuit that implements the logical method procedure can be easily obtained.

A controller can be implemented in any appropriate method. For example, the controller can use a microprocessor or a processor, and can store forms such as a computer readable medium, a logic gate, a switch, an application-specific integrated circuit (ASIC), a programmable logic controller, and an embedded microcontroller that are of computer readable program code (for example, software or hardware) that can be executed by the (micro) processor. Examples of the controller include but are not limited to the following microcontrollers: ARC 625D, Atmel AT91SAM, Microchip PIC18F26K20, or Silicone Labs C8051F320. A memory controller can also be implemented as a part of control logic of the memory.

A person skilled in the art also knows that, in addition to implementing the controller in a pure computer readable program code method, logic programming can be completely performed by using the method step, so that the controller implements a same function in a form of a logical gate, a switch, an application-specific integrated circuit, a programmable logic controller, an embedded microcontroller, etc. Therefore, the controller can be considered as a hardware component, and an apparatus for implementing various functions in the controller can also be considered as a structure in a hardware component. Or an apparatus configured to implement various functions can be considered as a software module or a structure in a hardware component that can implement the method.

The system, apparatus, module, or unit described in the described implementations can be implemented by a computer chip or an entity, or implemented by a product with a function.

For ease of description, the described apparatus is described by dividing functions into various units. Certainly, when the present application is implemented, the functions of the units can be implemented in one or more pieces of software and/or hardware.

Based on the described descriptions of the implementations, a person skilled in the art can clearly understand that the present application can be implemented by software and a necessary general purpose hardware platform. Based on such an understanding, the technical solutions of the present application essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, or a network device) to perform the method described in the implementations or some parts of the implementations of the present application.

The implementations in this specification are all described in a progressive method. For same or similar parts in the implementations, refer to these implementations. Each implementation focuses on a difference from other implementations. Especially, a system implementation is basically similar to a method implementation, and therefore is described briefly. For related parts, refer to partial descriptions in the method implementation.

The present application can be applied to many general purpose or dedicated computer system environments or configurations, for example, a personal computer, a server computer, a handheld device or a portable device, a flat-type device, a multiprocessor system, a microprocessor-based system, a set-top box, a programmable consumer digital device, a network PC, a small computer, a mainframe computer, and a distributed computing environment including any of the described systems or devices.

The present application can be described in common contexts of computer executable instructions executed by a computer, such as a program module. Generally, the program module includes a routine, a program, an object, a component, a data structure, etc. executing a specific task or implementing a specific abstract data type. The present application can also be practiced in distributed computing environments. In these distributed computing environments, tasks are executed by remote processing devices that are connected by using a communications network. In the distributed computing environments, the program module can be located in local and remote computer storage media that include storage devices.

Although the present application is depicted by using the implementations, a person of ordinary skill in the art knows that the present application has many variations and changes without departing from the spirit of the present application, and it is expected that the appended claims include these variations and changes without departing from the spirit of the present application.

Figure 7:
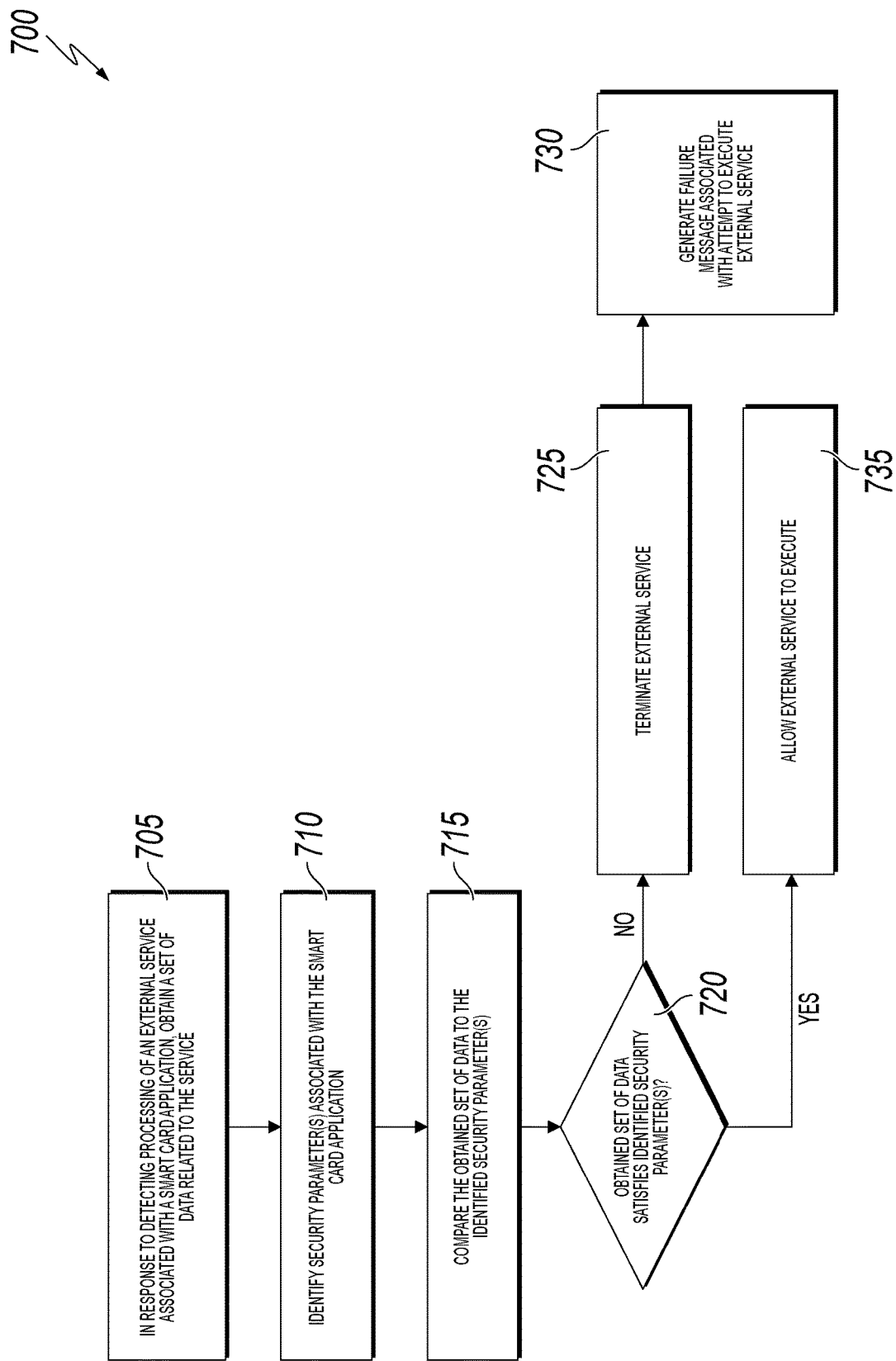
FIG. 7 is a flowchart illustrating an example of a computer-implemented method for a security verification method, according to an implementation of the present disclosure.

FIG. 7 is a flowchart illustrating an example of a computer-implemented method 700 for a security verification method, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 705, in response to detecting processing of an external service associated with a smart card application, a set of data related to the external service is obtained. In some instances, the data may represent or comprise one or more of a current location of the service and/or the intelligent terminal associated with the smart card application, a current time, or a set of transaction information specific to the service. The location of the service may be based on an external component with which a transaction or other interaction is being performed. In other instances, the current location may a current location of the intelligent terminal itself. The current location may be based on or obtained from a GPS module, chip, or other component of the intelligent terminal, in some instances. In other instances, the current location may be based on a particular base station position, as well as any other suitable information or data, such as one or more available networks, a relative location of a nearby sensor, or other suitable location information. The current time may be determined based on a system clock of the intelligent terminal or on a network or other accessible clock. The set of transaction information may be based on or associated with a particular transaction order or interaction associated with the intelligent terminal and/or one of its applications. For example, the service may be associated with a payment action or payment service. In such instances, the transaction information may include one or more parties, an amount of the transaction, or any other suitable transaction-related information.

In some instances, the processing of the external service may be detected in response to monitoring operations between a smart card application and one or more other components, such as a near-field communication (NFC) controller. The NFC controller may communicate with the smart card application in response to a particular transaction being performed, where the transaction is performed using a particular service. In response to detecting communications between the NFC controller and the smart card application, operation 705 may be performed to obtain information related to the current particular service. In other instances, the processing of the service may be detected when a notification is received by the smart card application from one or more components. For example, a notification may be received from the NFC controller described above (or another suitable component) when a service associated with the smart card application is being performed, such as a service instruction or interaction.

From 705, method 700 proceeds to 710. At 710, one or more security parameters associated with processing the external service are identified. The one or more security parameters can define particular restrictions or allowances for when a particular service can be executed. In some instances, the one or more security parameters may be based on input received from a user associated with the intelligent terminal. In those instances, the user may specify particular thresholds or requirements associated with allowed or restricted operations associated with the particular service. For example, if the service relates to purchases, a transaction threshold may be defined which limits particular purchases to a total amount threshold, e.g., $1000 per transaction. If a purchase is below $1000, then the transaction may be allowed. If the transaction is above $1000, the transaction may not be allowed. Similarly, one or more locations or times at which the service can be executed may be defined and used as a security parameter. In those instances, a location or area A may be defined in which transactions are allowed. If within that area A, for example, transactions may be allowed, while outside of that area, transactions may not be allowed. Similarly, the set of security parameters may define a time at which services are allowed. Attempted processing outside of those times may not be allowed. In some instances, multiple security parameters of different types (e.g., times, locations, amounts) may be applied and considered at one time, allowing for complex sets of security parameters to be defined and used for particular services.

In some instances, at least some of the security parameters may be automatically derived based on a historical analysis of prior user actions. For example, a user's prior actions may occur within a standard transaction amount, or at one or more known locations. After a historical analysis of the user's history, security parameters may identify a threshold transaction amount of $X, and may identify three allowed geographic areas in which transactions are allowed to be performed based on those areas being regular locations of the user. In some instances, security parameters may be defined as allowed parameters (e.g., allowed areas in which a transaction can proceed) or as restricted parameters (e.g., no transactions allowed in area C), or as a combination thereof. From 710, method 700 proceeds to 715.

In some instances, multiple services may be available to an intelligent terminal. In such instances, different sets of service-related data may be obtained at 705 based on the particular service, while at 710, a set of security parameters specific to the particular service may be identified. Different services may provide or be associated with different sets of data, as well as different sets of security parameters.

At 715, the obtained set of data associated with the particular service can be compared to the set of security parameters. At 720, the results of the comparison are analyzed to determine whether the obtained set of data satisfies or otherwise complies with the identified security parameters. When the obtained set of data satisfies the security parameters, the service may be considered secure and allowed to proceed. When the obtained set of data does not satisfy or comply with the security parameters, the particular service may be terminated or otherwise stopped.

In response to determining from the comparison that the obtained set of data does not comply with or satisfy the identified security parameters for the particular service, method 700 proceeds to 725, where the particular service is terminated or otherwise stopped. In some instances, the smart card application may cancel a connection to the particular service or otherwise communicate information indicating that the particular service is to be cancelled or stopped, such as an Abort or Exit command. In some instances, at 730, a failure message or other indication of the termination can be generated and presented to a user interface at the intelligent terminal or through another application or device. The failure message may, in some instances, transmit a generated message through a separate or different channel, such as an email, text message, or alternative notification in order not to present information on the termination to the current user of the terminal, who may not be an authorized user.

Returning to 720, in response to determining from the comparison that the obtained set of data does comply or satisfy the identified security parameters for the particular service, method 700 proceeds to 735, where the particular service is determined to be authorized based on the identified set of security parameters and is allowed to execute or otherwise continue processing. In some instances, no action is taken when the security parameters are satisfied. In other instances, a notification may be provided to a user interface of the intelligent terminal indicating that the service is authorized or otherwise allowed.

After 730 or 735, method 700 may stop.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/ augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method performed by one or more processors, comprising:

receiving, by a near field communication (NFC) controller of an intelligent terminal, information related to a transaction from a point of service device;

transmitting, by the NFC controller, to a security verification application of the intelligent terminal, a notification of the information related to the transaction;

receiving, by the security verification application, the transmitted notification of the information related to the transaction;

determining, by the security verification application, that the transmitted notification of the information related to the transaction was received;

based on the determination, by the security verification application, that the transmitted notification of the information related to the transaction was received, obtaining, by the security verification application, transaction data of the transaction;

applying, by the security verification application, a set of security parameters to the transaction data, wherein the set of security parameters is stored on the intelligent terminal and is associated with a smart card application of the intelligent terminal, and determining, by the security verification application, that the transaction data does not satisfy the set of security parameters; and in response to determining that the transaction data does not satisfy the set of security parameters, terminating, by the security verification application, the transaction, and sending, by the security verification application, a failure message to the NFC controller.

2. The computer-implemented method of claim 1, wherein the transaction data comprises at least one of or a combination of location information associated with the intelligent terminal or time information.

3. The computer-implemented method of claim 2, comprising:

obtaining, by the security verification application, the location information from a global positioning satellite (GPS) module of the intelligent terminal.

4. The computer-implemented method of claim 1, wherein the set of security parameters identify at least one restriction threshold, wherein the at least one restriction threshold defines an allowed limit associated with execution of the transaction.

5. The computer-implemented method of claim 4, wherein the set of security parameters comprise at least one security parameter entered by a user at the intelligent terminal.

6. The computer-implemented method of claim 1, wherein terminating the transaction comprises canceling a connection associated with the transaction.

7. A non-transitory, computer-readable medium storing one or more instructions that, when executed by a computer system of an intelligent terminal, cause the computer system to perform operations comprising:

receiving, by a near field communication (NFC) controller of the intelligent terminal, information related to a transaction from a point of service device;

transmitting, by the NFC controller, to a security verification application of the intelligent terminal, a notification of the information related to the transaction;

receiving, by the security verification application, the transmitted notification of the information related to the transaction;

determining, by the security verification application, that the transmitted notification of the information related to the transaction was received;

based on the determination, by the security verification application, that the transmitted notification of the information related to the transaction was received, obtaining, by the security verification application, transaction data of the transaction;

applying, by the security verification application, the identified a set of security parameters to the transaction data, wherein the set of security parameters is stored on the intelligent terminal and is associated with a smart card application of the intelligent terminal, and determining, by the security verification application, that the transaction data does not satisfy the set of security parameters; and in response to determining that the transaction data does not satisfy the set of security parameters, terminating, by the security verification application, the transaction, and sending, by the security verification application, a failure message to the NFC controller.

8. The non-transitory, computer-readable medium of claim 7, wherein the transaction data comprises at least one of or a combination of location information associated with the intelligent terminal or time information.

9. The non-transitory, computer-readable medium of claim 8, wherein the operations comprise:
obtaining, by the security verification application, the location information from a global positioning satellite (GPS) module of the intelligent terminal.

10. The non-transitory, computer-readable medium of claim 7, wherein the set of security parameters identify at least one restriction threshold, wherein the at least one restriction threshold defines an allowed limit associated with execution of the transaction.

11. The non-transitory, computer-readable medium of claim 10, wherein the set of security parameters comprise at least one security parameter entered by a user at the intelligent terminal.

12. The non-transitory, computer-readable medium of claim 7, wherein terminating the transaction comprises canceling a connection associated with the transaction.

13. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:
receiving, by a near field communication (NFC) controller of an intelligent terminal, information related to a transaction from a point of service device;
transmitting, by the NFC controller, to a security verification application of the intelligent terminal, a notification of the information related to the transaction;
receiving, by the security verification application, the transmitted notification of the information related to the transaction;
determining, by the security verification application, that the transmitted notification of the information related to the transaction was received;
based on the determination, by the security verification application, that the transmitted notification of the information related to the transaction was received, obtaining, by the security verification application, transaction data of the transaction;
applying, by the security verification application, the identified a set of security parameters to the transaction data, wherein the set of security parameters is stored on the intelligent terminal and is associated with a smart card application of the intelligent terminal, and determining, by the security verification application, that the transaction data does not satisfy the set of security parameters; and
in response to determining that the transaction data does not satisfy the set of security parameters, terminating, by the security verification application, the transaction, and sending, by the security verification application, a failure message to the NFC controller.

14. The computer-implemented system of claim 13, wherein the transaction data comprises at least one of or a combination of location information associated with the intelligent terminal or time information, and wherein the location information is obtained by the security verification application from a global positioning satellite (GPS) module of the intelligent terminal.

15. The computer-implemented method of claim 1, comprising
obtaining the set of security parameters from a remote server by a communication module of the intelligent terminal.

* * * * *